US012442596B2

(12) United States Patent
Ferguson

(10) Patent No.: US 12,442,596 B2
(45) Date of Patent: Oct. 14, 2025

(54) SPRAY-COOLED FURNACE ROOF WITH GRAVITY DRAIN

(71) Applicant: Systems Spray-Cooled, Inc., Smyrna, TN (US)

(72) Inventor: Scott A. Ferguson, Murfreesboro, TN (US)

(73) Assignee: Systems Spray-Cooled, Inc., Smyrna, TN (US)

( * ) Notice: Subject to any disclaimer, the term of this patent is extended or adjusted under 35 U.S.C. 154(b) by 897 days.

(21) Appl. No.: 17/685,209

(22) Filed: Mar. 2, 2022

(65) Prior Publication Data

US 2023/0280096 A1 Sep. 7, 2023

(51) Int. Cl.
*F27D 9/00* (2006.01)
*F27B 3/06* (2006.01)

(52) U.S. Cl.
CPC ................ *F27D 9/00* (2013.01); *F27B 3/065* (2013.01); *F27D 2009/0016* (2013.01)

(58) Field of Classification Search
CPC ..... F27D 9/00; F27D 1/12; F27D 1/16; F27D 1/1808; F27D 1/1816; F27D 2009/0016; F27D 2009/0018; F27D 2009/0064; F27D 2009/0067; F27B 3/065; F27B 3/085; F27B 3/16; F27B 3/24
See application file for complete search history.

(56) References Cited

U.S. PATENT DOCUMENTS 4,789,991 A 12/1988 Metelmann et al.
4,815,096 A * 3/1989 Burwell .................... F27D 9/00 373/74
4,849,987 A * 7/1989 Miner, Jr. ............. F27D 1/1816 373/74
5,115,184 A * 5/1992 Arthur ...................... F27B 3/24 373/95
5,290,016 A * 3/1994 Elsner ....................... F27D 9/00 266/190
5,444,734 A * 8/1995 Arthur .................. F27D 1/1816 373/73
(Continued)

FOREIGN PATENT DOCUMENTS

KR 100894302 B1 4/2009

OTHER PUBLICATIONS

Search Report from Austrian Patent Application No. GM 25/2022 dated Oct. 12, 2022.

*Primary Examiner* — Hung D Nguyen
(74) *Attorney, Agent, or Firm* — Patterson + Sheridan, LLP

(57) ABSTRACT

Disclosed herein is a metallurgical furnace and roof having a drain system. The roof has a roof body comprising a top surface having a center opening, a bottom surface opposite the top surface, and an outer sidewall connecting the top surface to the bottom surface. The outer sidewall, the bottom surface and the top surface define an interior portion. An internal spray cooling system is disposed in the interior portion of the body. A drain system is integral with the body. The drain system has a roof evacuation conduit disposed outside the interior portion and configured to collect spay coolant from the interior portion of the body. The drain system additionally has a drain box having a vent and an exit pipe, wherein the roof evacuation conduit channels spent coolant by gravity into the drain box which is evacuated under gravity by the exit pipe.

20 Claims, 6 Drawing Sheets

(56) References Cited

U.S. PATENT DOCUMENTS

| | | | | |
|---|---|---|---|---|
| 5,548,612 | A * | 8/1996 | Matsuo | F27D 1/1816<br>373/76 |
| 5,648,981 | A * | 7/1997 | Miner, Jr. | F27D 1/1816<br>373/73 |
| 5,887,017 | A * | 3/1999 | Arthur | F27D 1/1816<br>373/73 |
| 5,999,558 | A * | 12/1999 | Miner, Jr. | F27D 1/1816<br>373/9 |
| 2008/0128962 | A1 * | 6/2008 | Arthur | F27B 3/24<br>266/193 |
| 2014/0029643 | A1 * | 1/2014 | Lee | F27B 14/12<br>373/73 |
| 2018/0299201 | A1 | 10/2018 | Ferguson et al. | |
| 2019/0063840 | A1 | 2/2019 | Ferguson et al. | |
| 2019/0219334 | A1 | 7/2019 | Ferguson et al. | |
| 2020/0025448 | A1 | 1/2020 | Ferguson et al. | |
| 2020/0132373 | A1 | 4/2020 | Ferguson et al. | |

* cited by examiner

SPRAY-COOLED FURNACE ROOF WITH GRAVITY DRAIN

BACKGROUND OF THE DISCLOSURE

Field of the Disclosure

Embodiments of the present disclosure relates generally to a metallurgical furnace used in the processing of molten materials, the metallurgical furnace having a roof with a spray cooling system. More specifically, the present disclosure relates to a spray cooled metallurgical furnace roof having a gravity drain.

Description of the Related Art

Metallurgical furnaces (e.g., an electric arc furnace, a ladle metallurgical furnace and the like) are used in the processing of molten metal materials. The electric arc furnace heats charged metal in the furnace by an electric arc from a graphite electrode. The electric current from the electrode passes through the charged metal material forming a molten bath of the metal materials. The molten materials include molten steel and slag (a stony waste material).

A metallurgical furnace has a number of components, including a roof that is retractable, a hearth that is lined with refractory brick, and a sidewall that sits on top of the hearth. The metallurgical furnace typically rests on a tilting platform to enable the furnace to tilt about an axis. During the processing of molten materials, the furnace tilts in a first direction to remove slag through a first opening in the furnace referred to as the slag door. Tilting the furnace in the first direction is commonly referred to as "tilting to slag." The furnace must also tilt in a second direction during the processing of molten materials to remove liquid steel via a tap spout. Tilting the furnace in the second direction is commonly referred to as "tilting to tap." The second direction is generally in a direction substantially opposite the first direction.

Because of the extreme heat loads generated during the processing of molten materials within the metallurgical furnace, various types of cooling methods are used to regulate the temperature of furnace components, for example, the roof and sidewall of the furnace. One cooling method, referred to as non-pressurized spray-cooling, sprays a fluid-based coolant (e.g., water) against an external surface of plates comprising the furnace. The plate may be a part of a roof of the furnace or a part of a sidewall of the furnace. To prevent the plates from overheating, the fluid-based coolant is sprayed from a fluid distribution outlet at atmospheric pressure. As the fluid-based coolant contacts the external surface of the plate, the plate is relieved of heat transferred to the plate from the molten materials within the furnace, thus regulating the temperature of the plate. An evacuation system is used to continually remove spent coolant (i.e., coolant that has contacted the external surface of the plate) from the plate.

The evacuation system has pumps which removes the spent coolant from the furnace. Due to the extreme heat of the furnace, large volumes of coolant must be removed by the evacuation system. The evacuation system is plumbed from the furnace to pumps. However, the pumps can be quite large and take up valuable real-estate in the furnace or at the furnace facility. The evacuation system is moves the spent coolant away from the furnace. With evacuation systems comes the potential for plumbing leaks which can be dangerous if the spent coolant contacts an extremely hot surface of the furnace. Additionally, the distance requires a large amount of energy by the pump to move the spent coolant from the furnace to a remote location.

Therefore, there is a need for an improved evacuation system for the spray-cooled furnace.

SUMMARY

Disclosed herein is a metallurgical furnace and roof having a drain system. The roof has a roof body comprising a top surface having a center opening, a bottom surface opposite the top surface, and an outer sidewall connecting the top surface to the bottom surface. The outer sidewall, the bottom surface and the top surface define an interior portion. An internal spray cooling system is disposed in the interior portion of the body. A drain system is integral with the body. The drain system has a roof evacuation conduit disposed outside the interior portion and configured to collect spay coolant from the interior portion of the body. The drain system additionally has a drain box having a vent and an exit pipe, wherein the roof evacuation conduit channels spent coolant by gravity into the drain box which is evacuated under gravity by the exit pipe.

In another example, a metallurgical furnace is disclosed. The metallurgical furnace has a tilt platform and a gantry crane attached to the tilt platform. The gantry crane has arms. A furnace body is disposed on the tilt platform. The furnace body has a sidewall. The sidewall has a top disposed opposite a bottom, wherein the sidewall surrounds an interior portion of the furnace body. A roof is disposed on the top of the sidewall. The roof has a roof body comprising a top surface having a center opening, a bottom surface opposite the top surface, and an outer sidewall connecting the top surface to the bottom surface. The outer sidewall, the bottom surface and the top surface define an interior portion. An internal spray cooling system is disposed in the interior portion of the body. A drain system is integral with the body. The drain system has a roof evacuation conduit disposed outside the interior portion and configured to collect spay coolant from the interior portion of the body. The drain system additionally has a drain box having a vent and an exit pipe, wherein the roof evacuation conduit channels spent coolant by gravity into the drain box which is evacuated under gravity by the exit pipe.

In yet another example, a method is disclosed for evacuating spent coolant from a spray cooled roof of a metallurgical furnace. The method begins by spraying coolant in an internal volume of a roof. The coolant is gravity feed into a roof drain disposed along an outer wall of the roof. Coolant is sprayed in an internal volume of an elbow vent for the roof. The coolant is gravity feed into an elbow drain disposed along an outer wall of the roof. The elbow drain and the roof drain channel into a drain box wherein an outlet of the elbow drain is disposed above an outlet of the roof drain. The drain box is drained of the spent coolant by gravity out an exit pipe.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
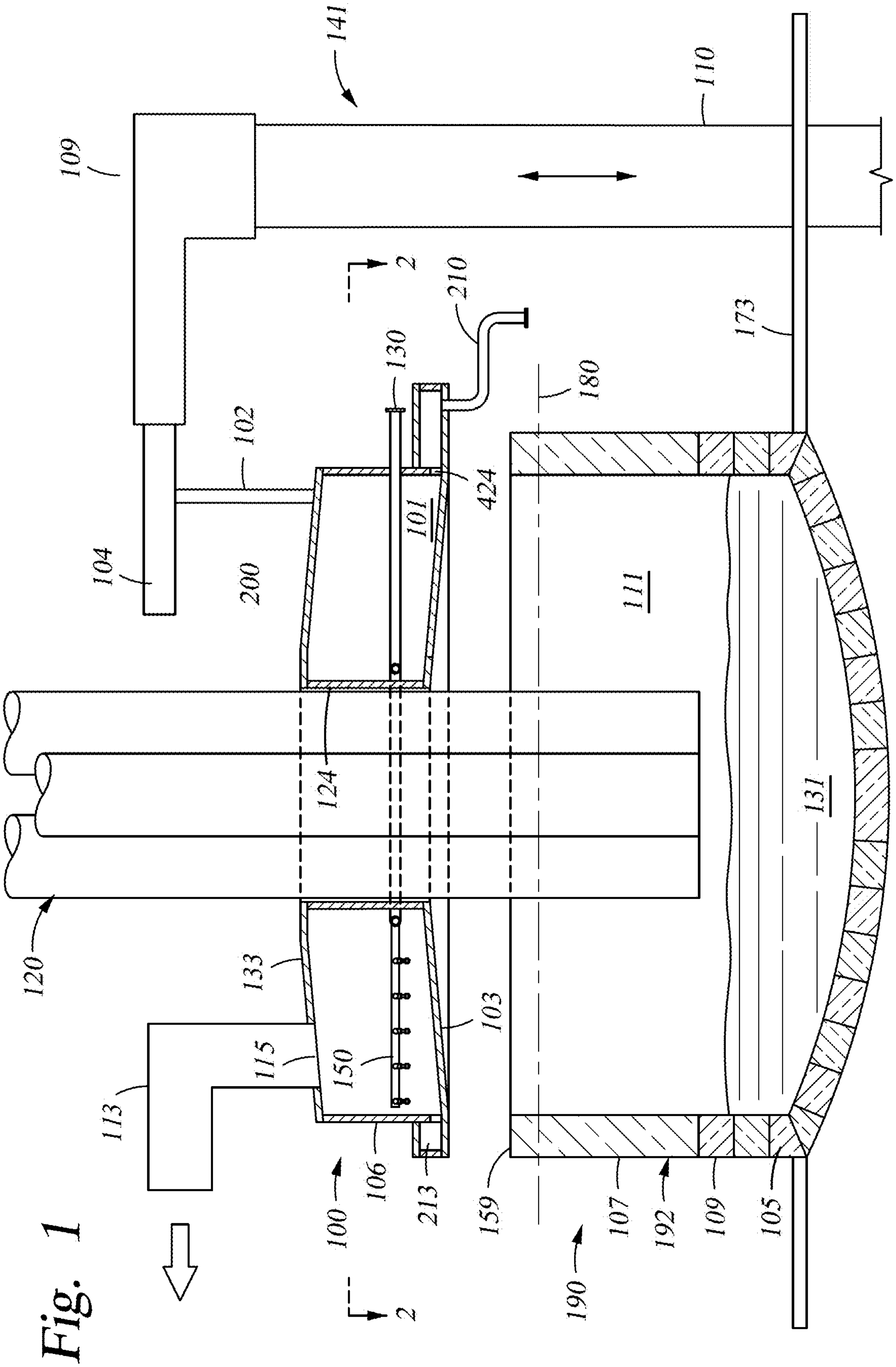
FIG. 1 is a schematic diagram of a metallurgical furnace.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

The present invention is directed to a metallurgical electric arc furnace having a spray-cooled roof having a pump-free integral drain system therein. The integral drain system relies on gravity to move spent cooling fluid and thus eliminates the need for a forced evacuation drain system of the spray-cooled roof, such as pumping by venturi or other pumps. The term integral herein meaning the body of the drain system is physically attached to the roof by techniques extending beyond mere plumbing and moves with the roof, for example, the drain system tilts with the roof as the furnace is tilted.

The spray-cooled roof is subject to high temperatures due to the exposure to molten metal materials present in the furnace. A spray-cooling system is employed within the roof to prevent overheating and excessive thermal stress of the roof. A coolant supply header provides coolant from an outboard coolant supply to the spray-cooled system. Gravity fed fluid passage from an enclosed space of the roof drains spent cooling fluid, i.e., hot coolant, to a periphery drain box of the roof.

The drain boxes of the roof are configured to remove the spent coolant. The drain box reduces the cost and complexity of the piping drain system by allowing the tap and slag side drains to be connected to a common drain line, whereas the conventional use of venturi pumps requires independent tap and slag drain lines. Eliminating the venturi pumps reduces the water requirement of the system by roughly 50% by eliminating the higher-pressure motive water required by the venturi pumps to remove the spent coolant. The tap and slag side drain boxes are vented to allow air to escape the roof drain system and to maintain the roof drain system at atmospheric pressure, preventing a potential air-lock in the piping system which could prevent coolant from being removed from the furnace roof.

The drain box size and orientation are selected such that the lift and swing operations of the furnace remains unchanged when conventional roofs are replaced with roofs having an integral drain system. The drain boxes are oriented such that no part of the drain box is directly over the furnace when the roof is swung open, eliminating exposure to the radiant heat and reducing the potential for water introduction into the furnace in the event of a leak.

A roof elbow drain system incorporates a sloped helical drain channel configured to promote gravity draining of spent spray coolant from the roof elbow while increasing the velocity of the elbow drain water into the roof drain boxes. The roof elbow drains into the sloped helical drain channel using dip-tubes having a flangeless connection, thus reducing the maintenance time required to connect/disconnect piping and/or hoses. The spent coolant from the roof elbow drain is introduced into the drain boxes at a point beyond the spent coolant from the major roof drain inlet which helps pull the roof spent coolant into the drain and aids evacuation.

Multiple openings through the roof outer diameter (OD) wall allows for distributed water drainage into the drain boxes, reducing the potential for water buildup within the roof cavity that would create a potential safety hazard. An internal baffle, or deflector plates, are incorporated into the roof to divert a portion of the roof water into the boxes at an optimal point so as not to potentially block the elbow drain water from entering the drain boxes. The exit pipes from the drain boxes are conical, acting as a funnel to reduce the velocity head requirements of the outlet drains and reducing potential water build-up within the roof cavity.

FIG. 1 is a schematic diagram of a metallurgical furnace 190. The metallurgical furnace 190 is suitable for melting scrap and other metals therein. The metallurgical furnace 190 may have internal temperatures exceeding 1,650° Celsius. The metallurgical furnace 190 utilizes a spray-cooling system 150 to protect the furnace from the elevated temperatures so as to avoid damage such as structural melting, compromise of seals or valves and/or exceeding the yield strength for structural components.

The metallurgical furnace 190 has a body 192. The body 192 has a hearth 109 that is lined with refractory brick 105, and a sidewall 107 that sits on top of the hearth 109. The sidewall 107 has a top 159. A roof 100 is moveably disposed on the top 159 of the sidewall 107. The metallurgical furnace 190 has an interior volume 111. The interior volume 111 of the metallurgical furnace 190 enclosed by the roof 100 and the body 192. The interior volume 111 may be loaded or charged with material 131, e.g., metal, scrap metal, or other meltable material, which is to be melted within the metallurgical furnace 190.

The metallurgical furnace 190, including the body 192 and the roof 100, is rotatable on a tilt platform 173 along a tilt axis 180 about which the metallurgical furnace 190 can tilt. The metallurgical furnace 190 may be tilted in a first direction about the tilt axis 180 toward the slag door (not shown) multiple times during a single batch melting process, sometimes referred to as a "heat", to remove slag. Similarly, the metallurgical furnace 190 may be tilted in a second direction about the tilt axis 180 towards a tap spout (not shown) multiple times during a single batch melting process including one final time to remove the molten material 131.

Roof lift members 102 may be attached at a first end to the roof 100. The roof lift members 102 may be a coupling, hinge, chains, cables, ridged supports, or other suitable mechanisms for supporting the roof 100. The roof lift members 102 may optionally be attached at a second end to a gantry superstructure 141 i.e., a crane or other suitable lifting structure. The gantry superstructure 141 has mast arms 104. The mast arms 104 extend horizontally and spread outward from a mast post 110. The gantry superstructure 141, i.e., mast support 108, and the mast post 110, moves vertically upward and rotates for lifting the roof 100 off of and away from the sidewall 107. In one embodiment, the roof 100 is configured to swing or lift away from the sidewall 107. The roof 100 is lifted away from the sidewall 107 to expose the interior volume 111 of the metallurgical furnace 190 through a top 159 of the sidewall 107 for loading material therein.

Figure 2:
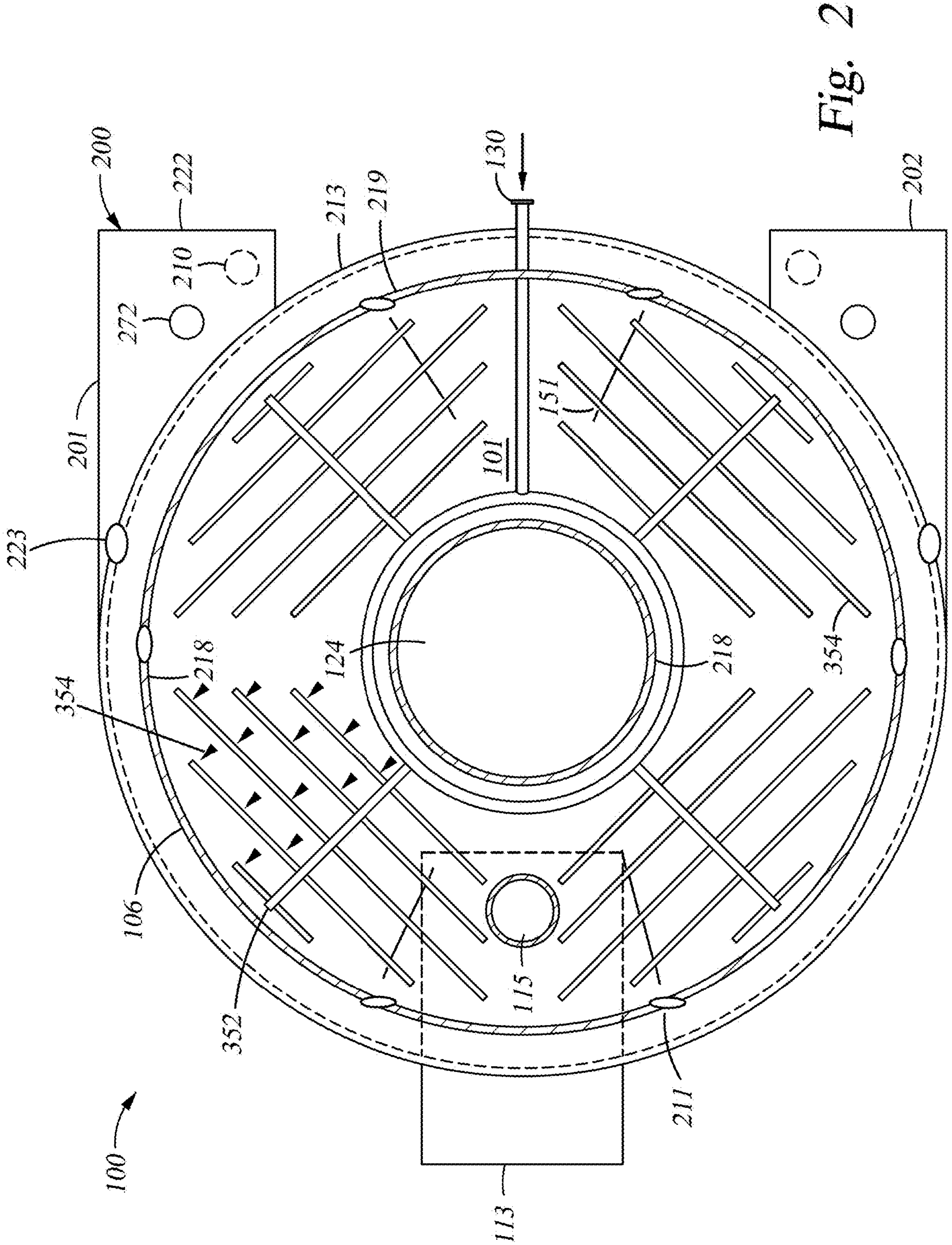
FIG. 2 is a horizontal sectional view of a spray-cooling system in a roof of the metallurgical furnace depicted in FIG. 1.

The roof 100 may be circular in shape when viewed from a top plan view, such as shown in FIG. 2. A central opening 124 may be formed through the roof 100. Electrodes 120 extend through the central opening 124 from a position above the roof 100 into the interior volume 111. During operation of the metallurgical furnace 190, the electrodes 120 are lowered through the central opening 124 into the interior volume 111 of the metallurgical furnace 190 to provide electric arc-generated heat to melt the material 131. The roof 100 may further include an exhaust port 115 to permit removal of fumes generated within the interior volume 111 of the metallurgical furnace 190 during operation.

The spray-cooling system 150 is disposed in an interior volume 101 of the roof 100 and additionally in an interior space of the exhaust port 115. The interior volume 101 of the roof 100 and interior space of the exhaust port 115 are fluidly isolated from the interior volume 111 of the metallurgical furnace 190 to prevent any coolant from the spray-cooling system 150 from entering into the interior volume 111 of the metallurgical furnace 190. FIG. 2 will additionally be used to describe the spray-cooling system 150 and a drain system 200 for the roof 100.

FIG. 2 is a horizontal sectional view of the spray-cooling system 150 in the roof 100 of the metallurgical furnace 190 depicted in FIG. 1. The roof 100 has an outer wall 106 an inner wall 125, a hot face 103 and a top wall 133. The outer wall 106, inner wall 125, hot face 103 and top wall 133 enclose the interior volume 101 of the roof 100. The outer wall 106 has an outer surface 219 and an inner surface 218. The inner surface 218 is exposed to and bounds the interior volume 101. The interior volume 101 is accessible by the electrodes through the central opening 124 in the top wall 133 substantially in the center of the roof 100.

The spray-cooling system 150 includes headers 352, spray bars 354 and a spray nozzles 356 fluidly coupled together. For simplicity, the spray nozzles 356 are only shown figuratively on a select portion of the spray bars 354 in the spray-cooling system 150. A coolant supply 130 is fluidly coupled to the spray-cooling system 150 disposed in the roof 100. The coolant supply 130 provides coolant into the headers 352. The coolant is distributed from the headers 352 through the spray bars 354 to the spray nozzles 356. The coolant, such as water or other suitable fluid, from the coolant supply 130 is provided by the spray-cooling system 150 to the interior volume 101 to cool the roof 100. The coolant is sprayed by the spray nozzles 356 within the interior volume 101 onto the hot face 103 facing the interior volume 111 of the metallurgical furnace 190 to maintain the roof 100 below a maximum operating temperature.

Figure 5:
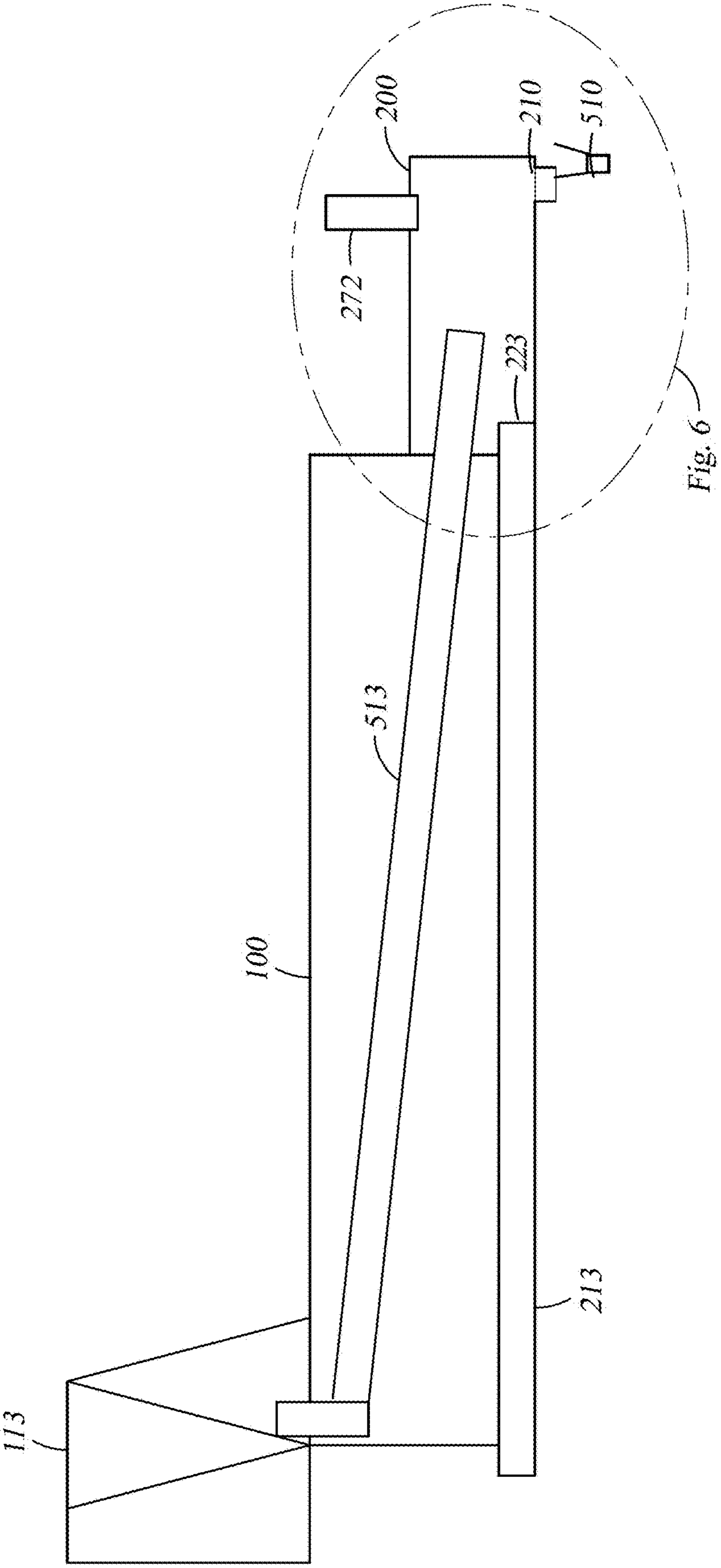
FIG. 5 is a schematic side view of the roof having the drain box.

The drain system 200 is provided in the roof 100 for removing spent coolant sprayed by the spray-cooling system 150 into the interior volume 101 of the roof 100. The drain system 200 is integral to the roof 100. The term integral herein meaning the body of the drain system 200 is physically attached to the roof 100 by techniques extending beyond mere plumbing and moves with the roof, for example, the drain system 200 tilts with the roof as the furnace is tilted. The drain system 200 will be discussed with additional reference to FIG. 5. FIG. 5 is a schematic side view of the drain system 200 for the roof 100. The drain system 200 eliminates the need for a conventional forced evacuation drain system, such as pumping by venturi or other pumps, for the roof 100 having the spray-cooling system 999.

Continuing to refer to FIG. 2, the drain system 200 includes an evacuation conduit 213 provided along the outer surface 219 of the outer wall 106 of the roof 100. Drain outlets 211, formed in the outer wall 106, evacuate the coolant from the interior volume 101 of the roof 100 into the evacuation conduit 213. The drain outlets 211 may be spaced along the outer wall 106 of the roof 100 to ensure essentially no standing water is present within the interior volume 101 regardless how the roof 100 is oriented.

The evacuation conduit 213 has an opening 223 fluidly coupling the evacuation conduit 213 to a drain box 202. The evacuation conduit 213 is a continuous unitary circumferential drain having dedicated one or more drain boxes 222, such as a slag side drain box 201 and a tap side drain box 202. In one example, the spray-cooling system 150 sprays coolant into the interior volume 101 and the sprayed spent coolant drains by gravity into the evacuation conduit 213. The roof evacuation conduit 213 directs the spent coolant to the drain boxes 222 where the spend coolant is removed by the drains 210.

The drain boxes 222 have a drain 210 for allowing spent coolant collected therein to be removed for re-use of for disposal. The spent coolant is drained by gravity from the drain boxes 222 into the drain 210. The drain boxes 222 additionally have a vent 272 to prevent vacuum from forming in the drain boxes 222 while draining the spent coolant. The vent 272 regulates airflow in the drain boxes 222 to assure spent coolant flows through the drain boxes 222 and drains out the drain 210. That is, the vent 222 prevents a vacuum from occurring that may cause slow or no drainage of the spent coolant.

Additionally, as shown in FIG. 5, spent cooling fluid is gravity fed from roof elbow 113 to the roof elbow drain 513. Although not visible in FIG. 5, the roof elbow 113 has a pair of roof elbow drains 513 disposed on the two outer walls of the roof elbow 113 adjacent the outer wall 106 of the roof 100. The roof elbow drain 513 may be affixed to or be a part of the roof 100. The roof elbow drain 513 incorporates a sloped helical drain channel that promotes for gravity draining of the coolant from the roof elbow 113 and increases the velocity of the coolant into the drain boxes 210. The velocity of the coolant entering in the drain boxes 210 aids the removal of spent coolant from the evacuation drain 213 as discussed below. The roof elbow 113 drains into the sloped helical drain channel using dip-tubes for a flangeless connection, eliminating maintenance time to connect/disconnect piping and/or hoses as present in conventional systems.

In one example, the roof elbow drain 513 is slope but not provided in a helical configuration to allow a smaller wall height.

The roof elbow drain 513 and the roof evacuation conduit 213 are sloped to the drain box 222 when the roof 100 and furnace 190 are in a horizontal position. The slope of the roof elbow drain 513 is greater than the slope of the roof evacuation conduit 213. The difference in slope is due from the roof elbow drain 513 traveling a further vertical distance over essentially the same horizontal distance as the roof evacuation conduit 213. An effect of the greater slope and the helical drain channel design of the roof elbow drain 513 is that the fluid flow rate in the roof elbow drain 513 has a higher velocity than the fluid flow rate in the roof evacuation conduit 213. The slope of the roof elbow drain 513 and the roof evacuation conduit 213 causes the spent coolant fluid to flow into the drain box 222 by gravity.

Figure 6:
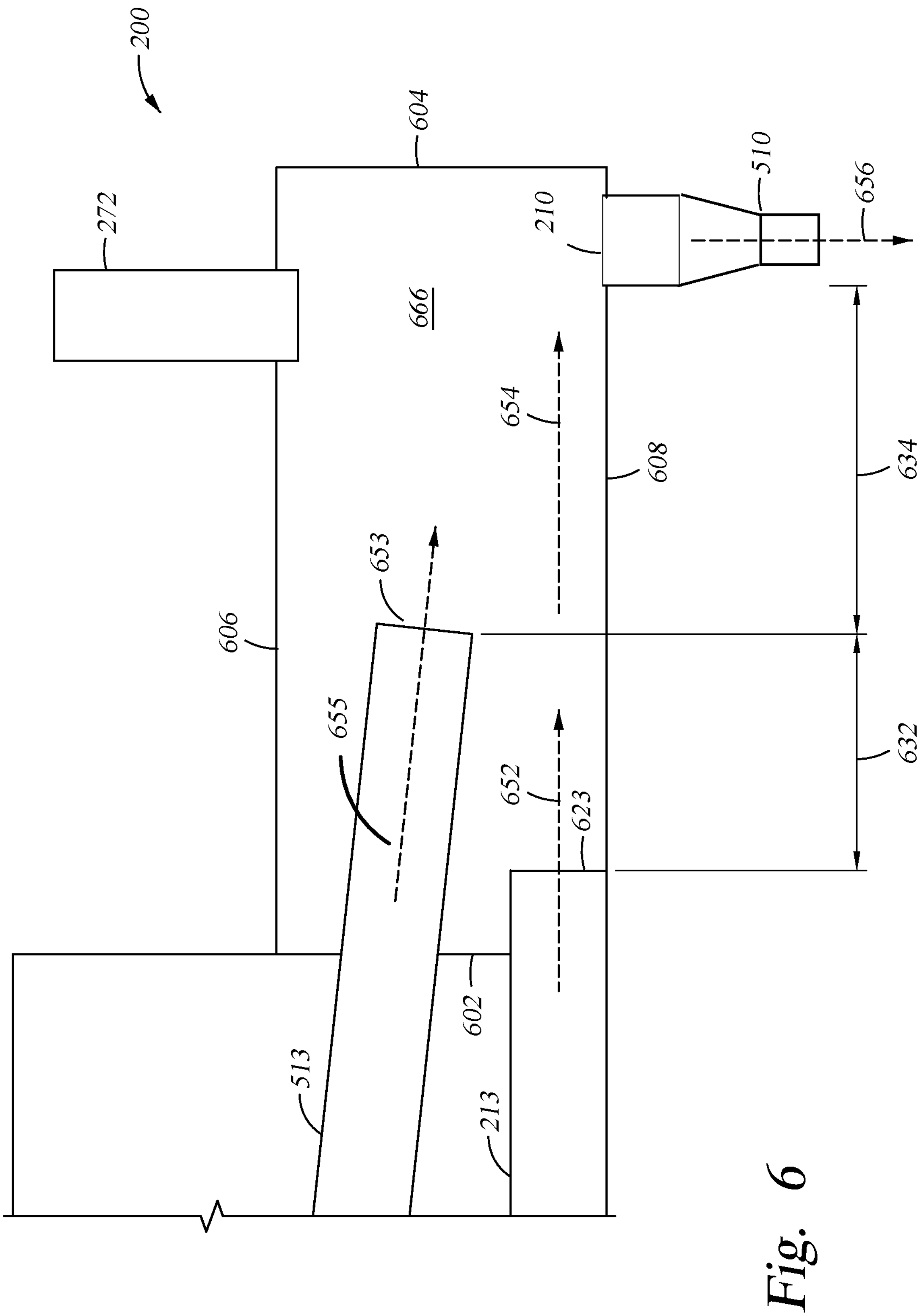
FIG. 6 is a schematic side view of the drain box depicted in FIG. 5.

An internal baffle, or deflector plates 151, may be incorporated into the interior volume 101 of the roof 100 and oriented to divert portions of the spent coolant into the various drain outlets 211. The deflector plates 151 divert the spent coolant that is shedding off the roof cone into the evacuation conduit 213 prior to the low point of the roof 100 to minimize water buildup in the interior volume 101 of the roof 100 when tilting. Once the spent coolant is in the evacuation conduit 213, the coolant flows in the roof evacuation conduit 213 to the drain boxes 222. The drain box 222 will be discussed with further reference to FIG. 6. FIG. 6 is a schematic side view of the drain box 222 depicted in FIG. 5.

The drain box 222 has a top wall 606, a bottom wall 608 and four sidewalls of which a first sidewall 602 and a second sidewall 604 are shown. The top wall 606, bottom wall 608 and four sidewalls enclose an interior volume 666. The vent 272 extends into the interior volume 666 of the drain box 222. The vent 272 in the drain boxes 222 allows air to escape the roof drain system 200 and allows the roof drain system 200 to be maintained at atmospheric pressure, as preventing a potential air-lock in the piping system and/or pressurized leaks. The bottom wall 608 may be angled to from the first sidewall 602 downward toward the second sidewall 604 to promote gravitational flow of fluid toward the second sidewall 604.

Spent coolant 655 from the roof elbow 113 enters the interior volume 666 of the drain box 222 from an end 653 of the elbow drain 513. Spent coolant 652 from the roof 100 enters the interior volume 666 of the drain box 222 from an end 623 of the evacuation conduit 213. The spent coolant 655 from the elbow drain 513 combines with the spent coolant 652 from the evacuation conduit 213 (shown by arrow 654 and 656) in the interior volume 666 of the drain box 222 and is removed from the drain box 222 by the drain 210.

The elbow drain 513 enters the drain box 222 above the evacuation conduit 213. In one example, the elbow drain 513 and the evacuation conduit 213 both enter the drain box 222 through the first sidewall 602. In another example, the elbow drain 513 enters the drain box 222 through the top wall 606 and the evacuation conduit 213 enters the drain box 222 through the first sidewall 602.

The end 653 of the elbow drain 513 extends a distance 632 beyond the end 623 of the evacuation conduit 213. That is, the elbow drain 513 extends further into the drain box 222 than the evacuation conduit 213. The arrangement of the end 653 of the elbow drain 513 disposed after the end 623 of the evacuation conduit 213 promotes drainage of the evacuation conduit 213. The increase speed of the spent coolant 655 from the elbow drain 513, discussed above, provided downstream and in front of the spent coolant 652 from the evacuation conduit 213 reduces the pressure in front of the spent coolant 652 coming from evacuation conduit 213. In this manner the elbow drain 513 does not impede the flow of the spent coolant 652 from the evacuation conduit 213 to the drain 210 in the drain boxes 222.

Exit pipes 510 are fluidly coupled to the drain 210 in the drain boxes 222. The exit pipes 510 are conical, acting as a funnel to reduce the velocity head requirements of the outlet drains and reducing potential spent coolant build-up within the interior volume 101 of the roof 100. The exit pipes 510 combine together to drain the drain boxes 222 collecting the spent coolant from the roof elbow 113 and the roof 100. The drain box 222 reduces the cost and complexity of the drain system 200 by allowing the tap and slag side drains to be connected to a common drain line, whereas the use of venturi pumps requires independent tap and slag drain lines in conventional systems. Eliminating the venturi pumps reduces the water requirement of the entire spray cooling and drainage system by roughly 50% when eliminating the higher-pressure motive water required by the venturi pumps.

Figure 3:
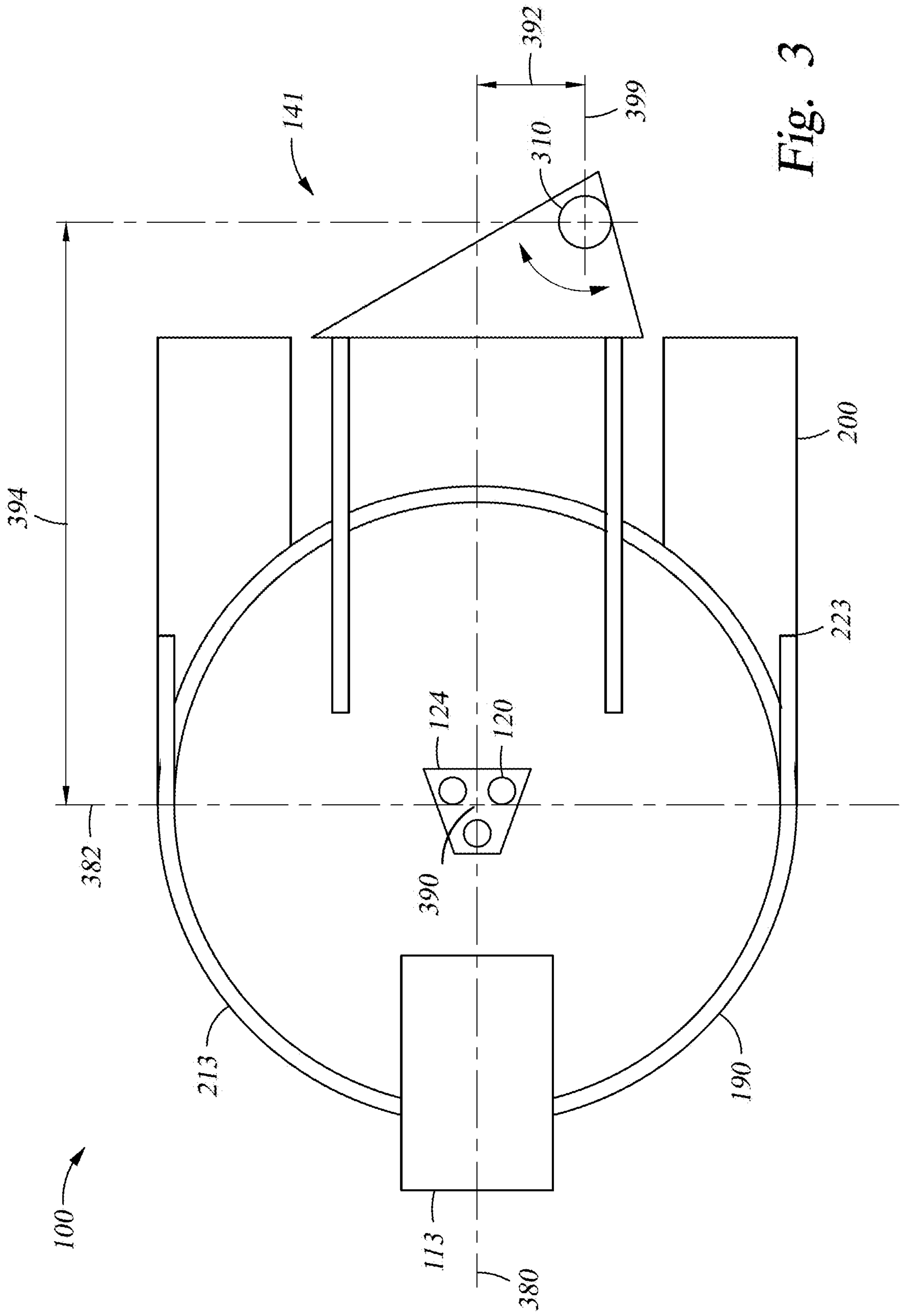
FIG. 3 is schematic top plan view of the roof having a drain box, the roof disposed on top of the metallurgical furnace depicted in FIG. 1.

The size and orientation of the drain system 200 are such that they do not interfere with the lift and swing operations of the roof 100. For example, the plumbing is clear of the furnace 190 when the roof 100 is swung clear of the furnace 190. FIG. 3 is schematic top plan view of the roof 100 having the drain box 222. The roof 100 is shown disposed on top of the metallurgical furnace 150.

The metallurgical furnace 150 has a center 390. When the roof 100 is closed on top of the metallurgical furnace 150, the center 390 aligns with the middle of the center opening 124 of the roof 100. The roof 100 has a gantry side where the gantry superstructure 141 connects to the roof 100 and vent side where the roof elbow 113 extends from the roof 100. A first line (X-axis) 380 is with respect to the metallurgical furnace 150 and can be more clearly understood as extending from the gantry side of the roof 100 to the vent side of the roof 100 through the center 390 when the roof 100 is in the closed position. The X-axis 380 bisects the gantry superstructure 141 and the roof elbow 113 when the roof 100 is in the closed position. A second line (Y-axis) 382 extends through the center 390 and is orthogonal to the X-axis 380.

The gantry superstructure 141 is configured to lift and swing the roof 100. The gantry superstructure 141 has a pivot 310 about which the gantry superstructure 141 rotates. The pivot 310 is offset an X-distance 394 from a center of the roof 100 and a Y-Distance 392 from the X-axis 380 bisecting the gantry superstructure 141. This results in an off-center axis of rotation for the gantry superstructure 141, and by way of physical connection, the roof 100.

Figure 4:
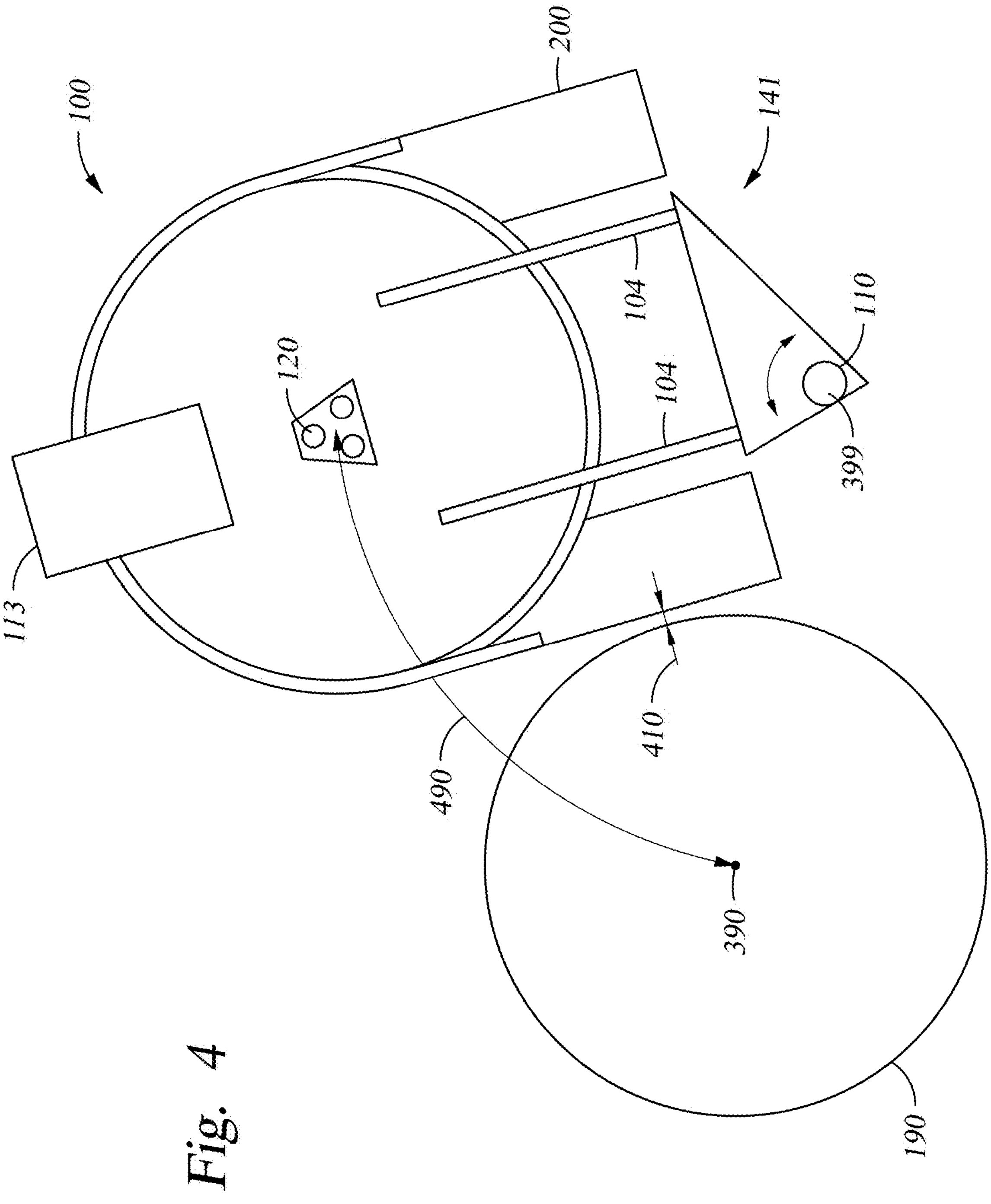
FIG. 4 is a schematic top plan view illustrating the drain box and roof swung clear from the metallurgical furnace.

FIG. 4 is a schematic top plan view illustrating the drain box 222 and roof 100 swung clear from the metallurgical furnace 150. The exit pipes 510 may be coupled to the gantry structure 141. As the gantry structure 141 rotates as shown by arrow 490 to move the roof 100 off the metallurgical furnace 150, the drain boxes 222 move with the roof 100 clear of the metallurgical furnace 150. In one example, a gap 410 is formed between drain boxes 222 and the metallurgical furnace 150. The drain boxes 222 are oriented such that no part of the drain boxes 222 is directly over the metallurgical furnace 150 when the roof 100 is swung open, eliminating exposure to the radiant heat and reducing the potential for water introduction into the furnace 100 in the event of a leak.

In summary, the drain box are advantageously configured to substantially eliminate the need for mounted pumps for pumping the spent coolant from the roof. The drain box reduces the cost and complexity of the piping drain system by allowing the tap and slag side drains to be connected to a common drain line, whereas the conventional use of venturi pumps requires independent tap and slag drain lines. The drain box size and orientation allow the lift and swing operations of the furnace to be performed without leaving the box directly over the furnace when the roof is swung open, eliminating exposure to the radiant heat and reducing the potential for water introduction into the furnace in the event of a leak. The roof elbow drain water is introduced into the drain boxes at a point beyond the roof water drain inlet which helps pull the roof water into the drain and aids evacuation. The exit pipes from the drain boxes are conical, acting as a funnel to reduce the velocity head requirements of the outlet drains and reducing potential water build-up within the roof cavity.

While the foregoing is directed to embodiments of the present disclosure, other and further embodiments may be devised without departing from the basic scope thereof, and the scope thereof is determined by the claims that follow.

What is claimed is:

1. A roof for a metallurgical furnace comprising:
- a body comprising:
  - a top surface having a center opening;
  - a bottom surface opposite the top surface; and
  - an outer sidewall connecting the top surface to the bottom surface, the outer sidewall, the bottom surface and the top surface defining an interior portion, wherein the outer sidewall has a lift side and a hood side;
- an internal spray cooling system disposed in the interior portion of the body; and
- a drain system integral with the body, the drain system comprising:
  - a roof evacuation conduit disposed outside the interior portion and configured to collect spay coolant from the interior portion of the body; and
  - a drain box having a vent and an exit pipe, wherein the drain box is at atmospheric pressure and the roof evacuation conduit channels spent coolant into the drain box which is sloped to the exit pipe for drainage.

2. The roof of claim 1 further comprising:
- a hood having a hood spray cooled system therein, wherein the drain system further comprises; and
- an elbow evacuation drain fluidly coupling the hood to the drain box.

3. The roof of claim 2, wherein the elbow evacuation drain extends further into the drain box than the roof evacuation conduit.

4. The roof of claim 2, wherein the elbow evacuation drain and the roof evacuation conduit are disposed through a wall of the drain box, and the elbow evacuation drain is disposed above the roof evacuation conduit.

5. The roof of claim 1, wherein the exit pipe is conical.

6. The roof of claim 1 further comprising:
- a second drain box, wherein the drain box and second drain box are disposed on the lift side of the outer sidewall.

7. The roof of claim 6 wherein the exit pipe of the drain box and second exit pipe of the second drain box are fluidly coupled together.

8. A metallurgical furnace comprising:
- a tilt platform;
- a gantry crane attached to the tilt platform, the gantry crane having arms;
- a furnace body disposed on the tilt platform, the furnace body comprising:
  - a sidewall, the sidewall having a top disposed opposite a bottom, wherein the sidewall surrounds an interior portion of the furnace body;
- a roof disposed on the top of the sidewall, the roof comprising:
  - a body comprising:
    - a top surface having a center opening;
    - a bottom surface opposite the top surface; and
    - an outer sidewall connecting the top surface to the bottom surface, the outer sidewall, the bottom surface and the top surface defining an interior portion, wherein the outer sidewall has a lift side and a hood side;
  - an internal spray cooling system disposed in the interior portion of the body; and
  - a drain system integral with the body, the drain system comprising:
    - a roof evacuation conduit disposed outside the interior portion and configured to collect spay coolant from the interior portion of the body; and
    - a drain box having a vent and an exit pipe, wherein the drain box is at atmospheric pressure and the roof evacuation conduit channels spent coolant into the drain box which is sloped to the exit pipe for drainage.

9. The metallurgical furnace of claim 8 further comprising:
- a hood having a hood spray cooled system therein, wherein the drain system further comprises; and
- an elbow evacuation drain fluidly coupling the hood to the drain box.

10. The metallurgical furnace of claim 9, wherein the elbow evacuation drain extends further into the drain box than the roof evacuation conduit.

11. The metallurgical furnace of claim 9, wherein the elbow evacuation drain and the roof evacuation conduit are disposed through a wall of the drain box and the elbow evacuation drain is disposed above the roof evacuation conduit.

12. The metallurgical furnace of claim 8, wherein the gantry crane has an off-center axis of rotation.

13. The metallurgical furnace of claim 12, wherein the drain box of the roof moves with the roof clear of the metallurgical furnace when the gantry crane rotates the roof clear of the metallurgical furnace.

14. The metallurgical furnace of claim 8, wherein the drain system is under atmospheric pressure.

15. The metallurgical furnace of claim 14, wherein the exit pipe is conical.

16. The metallurgical furnace of claim 8, wherein the drain system further comprises:
- a second drain box, wherein the drain box and second drain box are disposed on the lift side of the outer sidewall.

17. The metallurgical furnace of claim 16, wherein the exit pipe of the drain box and second exit pipe of the second drain box are fluidly coupled together at the gantry crane.

18. A method of evacuating spent coolant from a spray cooled roof of a metallurgical furnace, comprising:
- spraying coolant in an internal volume of a roof,
- gravity feeding the coolant into a roof drain disposed along an outer wall of the roof;
- spraying coolant in an internal volume of an elbow vent for the roof, gravity feeding the coolant into an elbow drain disposed along an outer wall of the roof;

channeling the elbow drain and the roof drain into a drain box wherein an outlet of the elbow drain is disposed above an outlet of the roof drain; and draining the drain box of spent coolant by gravity out an exit pipe.

19. The method of claim 18, wherein the drain box is sloped to the exit pipe and the exit pipe is conical.

20. The method of claim 18 further comprising:

flowing spent coolant out the outlet of the roof drain; and flowing spent coolant out the outlet of the elbow drain, wherein the flow from the elbow drain is closer to the exit pipe and draws the spent coolant flowing from the roof drain.

* * * * *